United States Patent
Chou (10) Patent No.: US 7,547,201 B2
(45) Date of Patent: Jun. 16, 2009

(54) COMPACT SIMPLIFIED COMPRESSOR APPARATUS

(75) Inventor: Vincent Chou, Tainan Hsien (TW)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 309 days.

(21) Appl. No.: 11/139,620

(22) Filed: May 31, 2005

(65) Prior Publication Data

US 2005/0265873 A1    Dec. 1, 2005

(30) Foreign Application Priority Data

Jun. 1, 2004    (JP)    ............... 2004-163526

(51) Int. Cl.
*F04B 39/10* (2006.01)
*F04B 53/12* (2006.01)
*F16J 9/20* (2006.01)

(52) U.S. Cl. .................. 417/552; 277/460; 277/438

(58) Field of Classification Search ............ 141/38; 92/245; 277/438, 395, 382, 376, 567, 530, 277/460; 417/552

See application file for complete search history.

(56) References Cited

U.S. PATENT DOCUMENTS

| | | | |
|---|---|---|---|
| 2,081,040 A | | 5/1937 | King |
| 2,360,731 A | * | 10/1944 | Smith ................. 277/453 |
| 3,040,712 A | * | 6/1962 | Harrah ................. 91/394 |
| 4,027,816 A | | 6/1977 | Slator et al. |
| 4,403,525 A | * | 9/1983 | Bongers ............... 74/579 E |
| 4,540,352 A | * | 9/1985 | Becker ................ 417/571 |
| 5,064,359 A | * | 11/1991 | Plummer ............... 417/489 |
| 5,092,125 A | * | 3/1992 | Leight-Monstevens et al. ............... 60/589 |
| 5,509,670 A | * | 4/1996 | Wheeler ............... 277/565 |
| 6,152,014 A | | 11/2000 | Willimczik |
| 6,189,894 B1 | * | 2/2001 | Wheeler ............... 277/549 |
| 6,889,723 B2 | * | 5/2005 | Gerresheim et al. ........ 141/38 |
| 7,017,914 B1 | * | 3/2006 | Sytsma et al. .......... 277/452 |
| 2002/0121331 A1 | * | 9/2002 | Gerresheim et al. ....... 156/115 |

FOREIGN PATENT DOCUMENTS

| | | |
|---|---|---|
| DE | 33 19 729 A1 | 12/1983 |
| EP | 1 358 996 A1 | 11/2003 |
| JP | 3082599 U | 9/2001 |
| JP | 3082724 U | 10/2001 |
| JP | 3082724 U | 10/2001 |
| WO | WO-86/04128 A1 | 7/1986 |

* cited by examiner

*Primary Examiner*—Charles G Freay
*Assistant Examiner*—Peter J Bertheaud
(74) *Attorney, Agent, or Firm*—Birch, Stewart, Kolasch & Birch, LLP (57) ABSTRACT

A compact simplified compressor apparatus is provided with a rotating shaft rotationally driven by a motor, a compact compressor activated by the rotating shaft, an air feeding means for feeding a high-pressure air from the compact compressor to a tire, and a power source plug supplying an electricity to the motor. The compact compressor is provided with a rod attached to the rotating shaft via a crank, a piston having a peripheral groove in an outer peripheral surface and integrally formed with the rod, a cylinder having a cylinder chamber receiving the piston so as to freely reciprocate, and a ring seal sealing between the piston and an inner peripheral surface of the cylinder chamber. The ring seal is provided with a base portion having a base surface seating on a groove wall surface in the rod side of the peripheral groove, and inner and outer lip portions, each extending from the base portion toward radially inside and outside so as to be opened toward the opposite rod side.

8 Claims, 11 Drawing Sheets

PRIOR ART

PRIOR ART

FIG.12

COMPACT SIMPLIFIED COMPRESSOR APPARATUS

BACKGROUND OF THE INVENTION

1. Field of the Invention

The present invention relates to a compact simplified compressor apparatus which has a high performance and excellent reliability, and can be easily activated even under a low temperature, and more particularly to a compact simplified compressor apparatus which can be preferably employed as a flat tire emergency repair kit for filling a flat tire with air and a sealing agent so as to allow emergency travel.

2. Prior Art

Figure 3:
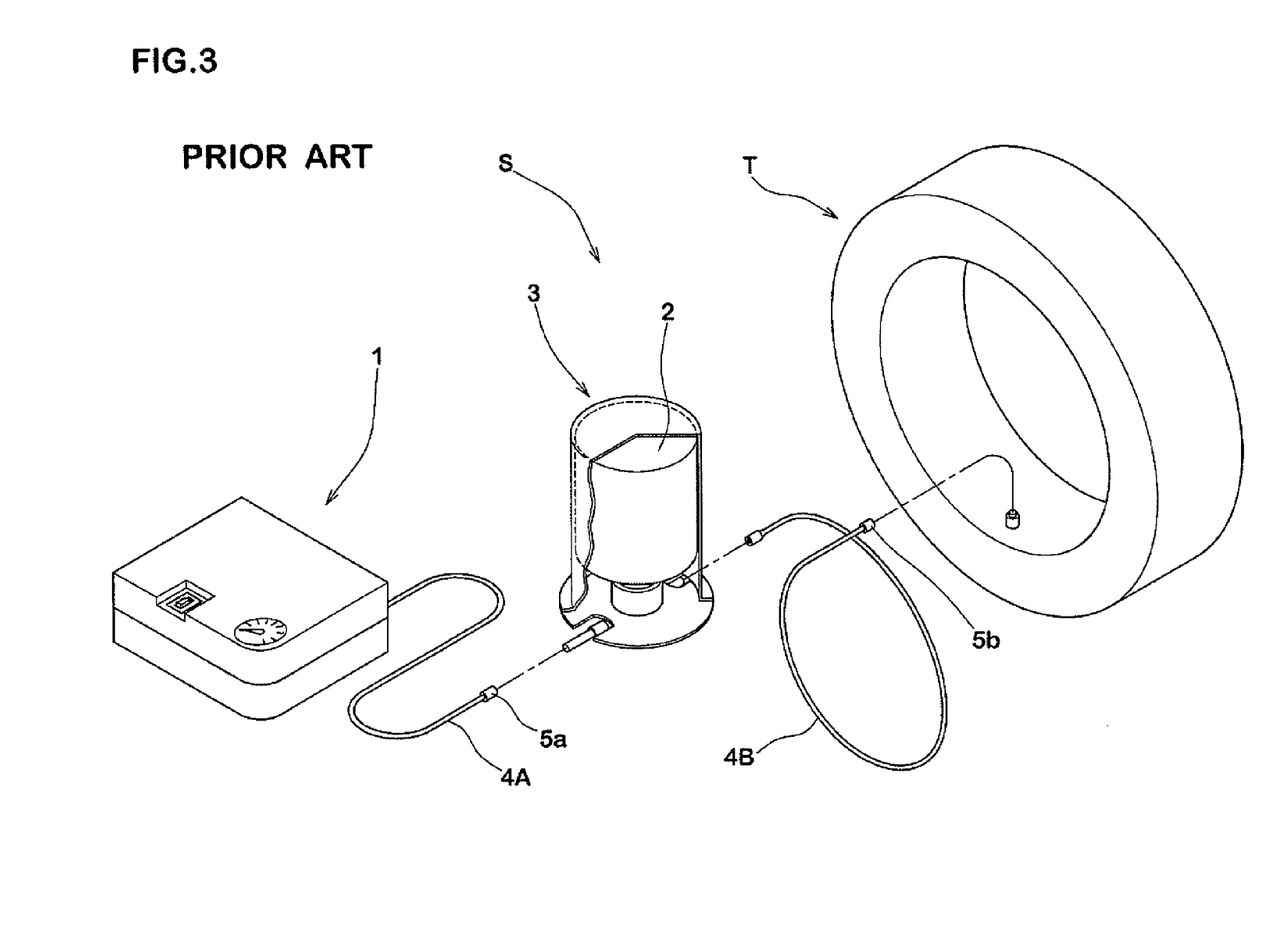
FIG. 3 is a perspective view showing a used state of a puncture emergency repairing kit.
Figure 4:
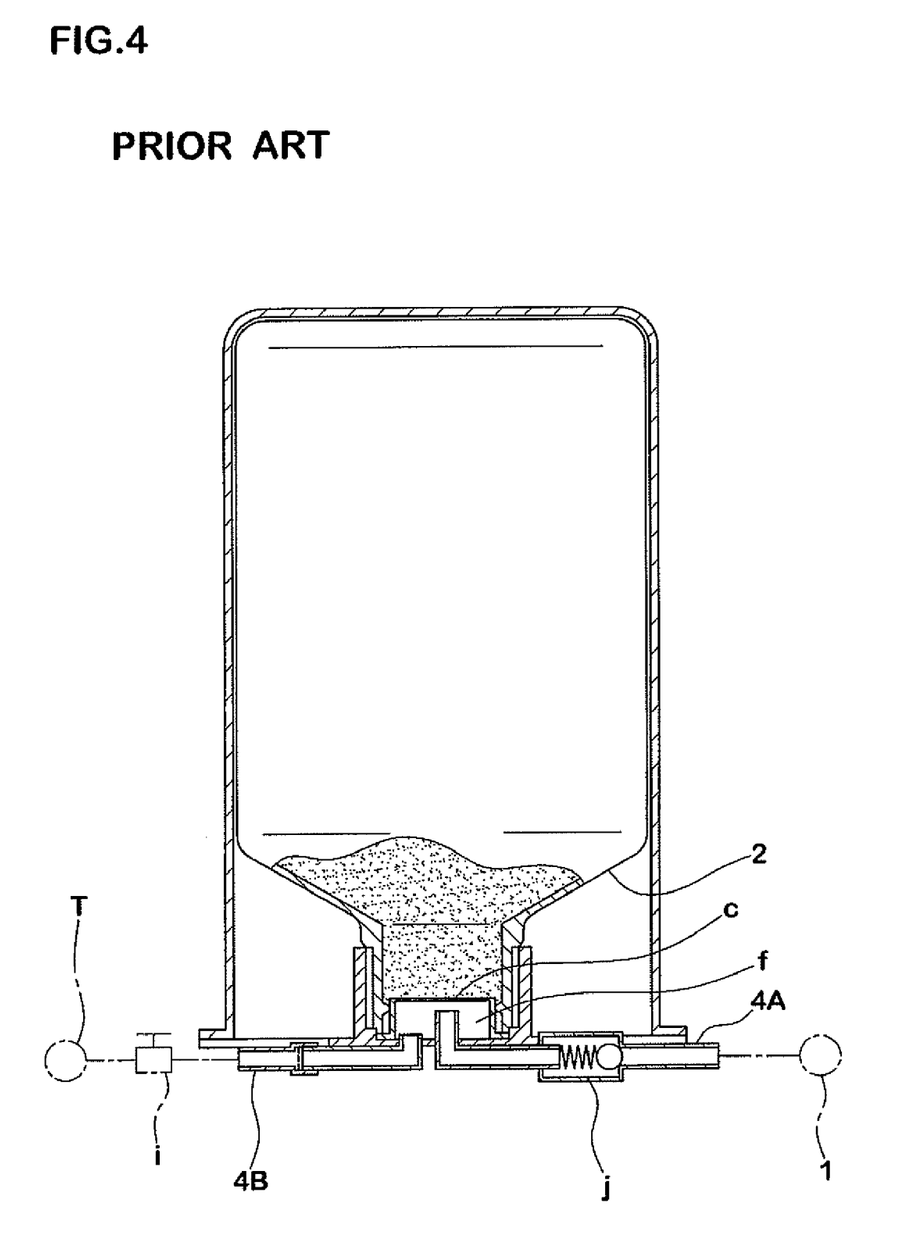
FIG. 4 is a cross sectional view showing a seal pump-up apparatus.

As a kit S for repairing the flat tire in an emergent manner, for example, as shown in FIGS. 3 and 4, there has been a structure constituted by a compact simplified compressor apparatus 1, and a seal pump-up apparatus 3 having a sealing can 2 filled with a puncture seal agent. The kit S can charge an internal pressure after feeding the sealing agent in the sealing can 2 to a flat tire T.

The compact simplified compressor apparatus 1 is connected to the seal pump-up apparatus 3 by a hose 4A having a joint 5a, and the seal pump-up apparatus 3 is connected to a valve of the tire T by a hose 4B having a joint 5b. Further, as shown in FIG. 4, a high-pressure air from the compact simplified compressor apparatus 1 is supplied to a sealed chamber f formed in a lower lid c of the sealing can 2, and breaks the lower lid c due to the pressure. Thereafter, the sealing agent is supplied to the tire T by opening a switch valve i in a downstream side. The tire can be pumped up at a predetermined internal pressure by continuously operating the compact simplified compressor apparatus 1 even after the supply of the sealing agent is finished. The puncture hole is closed by the sealing agent by immediately running for about ten minutes. Thereafter, the emergency repair is finished by again inspecting he internal pressure. In this case, a check valve j is provided in a leading end of the hose 4A, thereby preventing the sealing agent from flowing backward.

Figure 11:
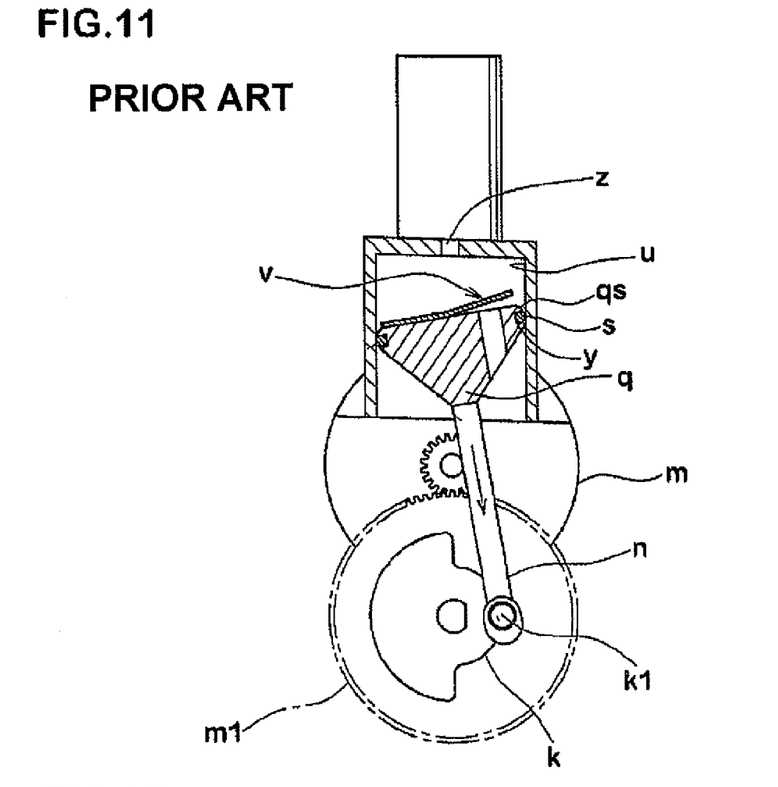
FIG. 11 is a cross sectional view showing a conventional compressor.

On the other hand, as a compact compressor of the compact simplified compressor apparatus used in the kit S mentioned above, there has been proposed a structure shown in FIG. 11 in Japanese Utility Model No. 3082724. The compact compressor is provided with a motor m, a wheel m1 driven at a reduced speed by the motor m so as to rotate, a crank k attached to the wheel m1, a rod n pivoted by a crank pin k1 of the crank k, and a piston q attached to a leading end portion of the rod n. Further, the rod n and the piston q are integrally formed, and a ring seal s such as an O-ring or the like fitted to a peripheral groove y of an outer peripheral surface qs of the piston q is arranged in the piston q.

In the compact compressor mentioned above, the piston q integrally works with the rod n in accordance with a rotation of the crank k so as to vertically slide within a cylinder chamber u. Further, when the piston q moves downward, an intake valve v provided in an upper surface of the piston q is opened so as to suck an air. Further, when moving upward, the intake valve v is closed so as to compress the air within the cylinder chamber u, and can discharge the compressed air from an air supply port z in an upper end.

Figure 12:
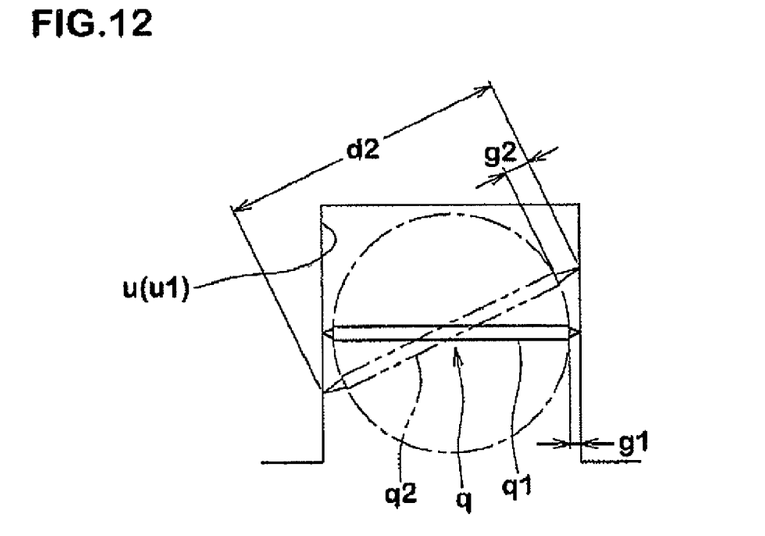
FIG. 12 is a diagrammatic view explaining a difference of a seal gap between a state of the top dead center and the bottom dead center, and a maximum inclined state.

In the motion mentioned above, the piston q becomes in a state q1 of being perpendicular to a center line of the cylinder chamber u at a top dead center and a bottom dead center of the piston q as shown by a solid line in FIG. 12. On the contrary, at an intermediate position between the top dead center and the bottom dead center, as shown by a broken line in FIG. 12, the piston q becomes in a maximum inclined state q2 of being inclined to the center line of the cylinder chamber u to the maximum. At this time, a gap g2 between an outer peripheral surface qs of the piston q and an inner peripheral surface u1 of the cylinder chamber u in the maximum inclined state q2 becomes larger than a gap g1 in the perpendicular state q1. This can be explained because an outline defined by connecting the portions where the outer peripheral surface qs of the piston q and the inner peripheral surface u1 of the cylinder chamber u contact becomes an oval on the basis of the incline of the piston q. Reference symbol d2 denotes a longer diameter of the oval in the maximum inclined state q2.

However, in the proposal mentioned above, as briefly shown in FIG. 11, since a solid ring body having a circular cross sectional shape and a rectangular shape such as the O-ring or the like is used as the ring seal s, it is impossible to sufficiently correspond to a change in the gap g generated on the basis of the incline of the piston q. Accordingly, a seal effect is insufficiently obtained, and it is hard to obtain a high pump efficiency. In particular, there are many cases that the puncture repairing kit S is used under a low temperature, for example, −30° C. during the winter months. Accordingly, in the compact compressor, it is strongly desired to sufficiently achieve the seal effect even under the low temperature condition, and restrict the reduction of the pump efficiency due to the low temperature to the minimum.

SUMMARY OF THE INVENTION

An object of the present invention is to provide a compact simplified compressor apparatus which can secure a sufficient seal effect even in the case that a piston is inclined with respect to a cylinder chamber and the case that the apparatus is used under a low temperature environment, can increase a pump efficiency while intending a weight saving and a compact structure, and can improve reliability.

In order to achieve the object mentioned above, in accordance with a first aspect of the present invention, there is provided a compact simplified compressor apparatus comprising:

a rotating shaft rotationally driven by a motor;

a compact compressor provided with a rod attached to the rotating shaft via a crank, a piston having a peripheral groove in an outer peripheral surface thereof and arranged in an end of the rod, a cylinder having a cylinder chamber receiving the piston so as to freely reciprocate, and a ring seal sealing between the piston and an inner peripheral surface of the cylinder chamber;

an air feeding means for feeding a high-pressure air from the compact compressor to a tire; and a power source plug supplying an electricity to the motor, wherein the rod and the piston are formed by an integrally formed body made of fiber reinforced plastics (FRP), wherein the peripheral groove of the piston has a groove wall surface in a rod side and a groove wall surface in an opposite rod side, each extends from each side of a groove bottom surface, and wherein the ring seal is provided with a base portion having a base surface seating on the rod side groove wall surface, and inner and outer lip portions, each extending from the base portion toward radially inside and outside so as to be opened toward the opposite rod side.

BRIEF DESCRIPTION OF THE DRAWINGS

FIG. 8 (B) is a diagrammatic view exemplifying a state of the piston at a top dead center or a bottom dead center;

FIG. 10 (B) is a plan view showing a terminal connecting spring thereof;

DESCRIPTION OF THE PREFERRED EMBODIMENTS

A description will be given below of a mode for carrying out the present invention together with an illustrated embodiment.

A compact simplified compressor apparatus 1 in accordance with the present embodiment is employed in a puncture emergency repairing kit S shown in FIGS. 3 and 4. The kit S repairs a flat tire in an emergent manner, and makes it possible to run up to a tire repair facility such as an automobile repair shop or the like.

Figure 1:
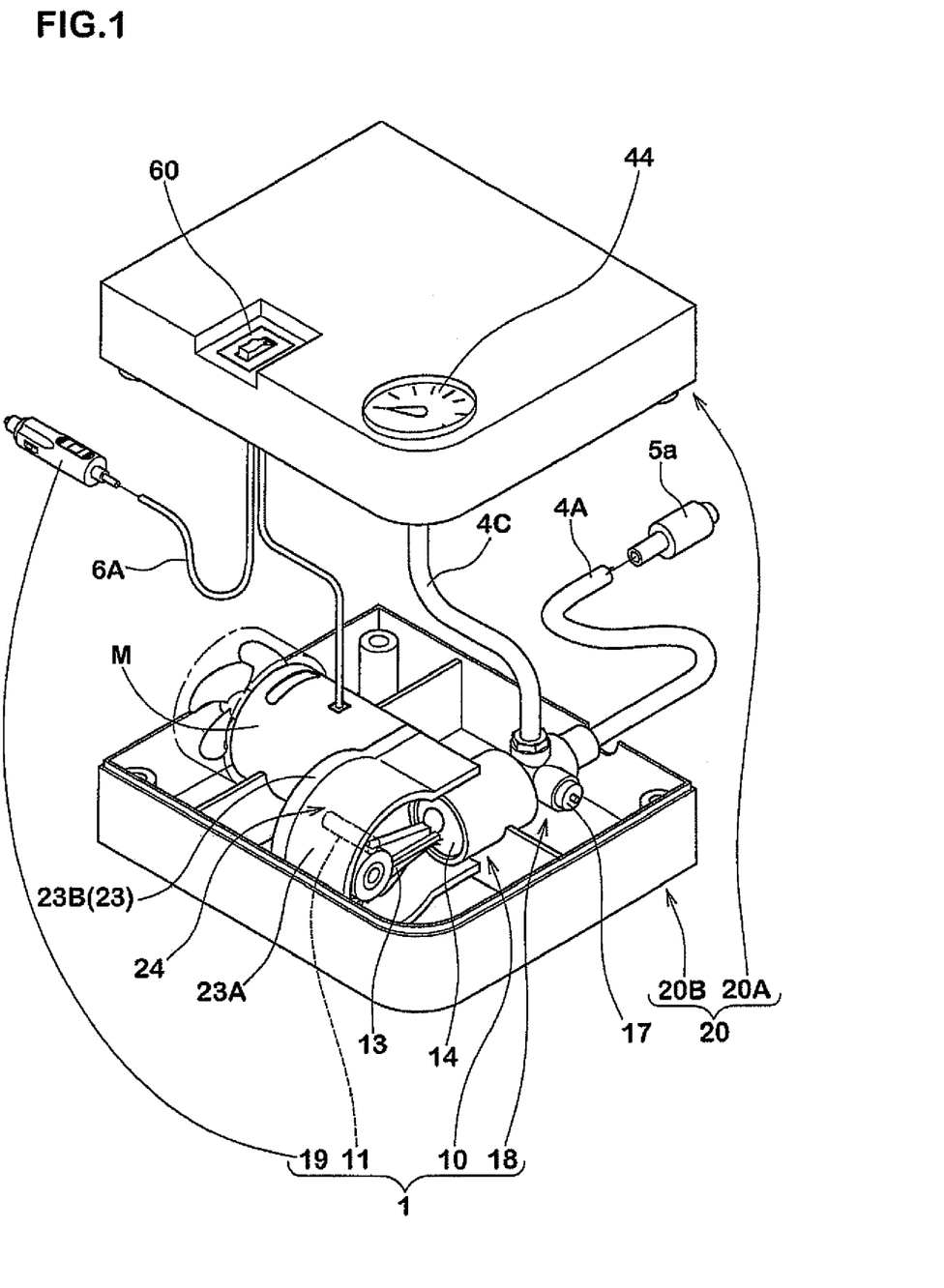
FIG. 1 is an exploded perspective view showing an example of a compact simplified compressor apparatus in accordance with the present invention.
Figure 2:
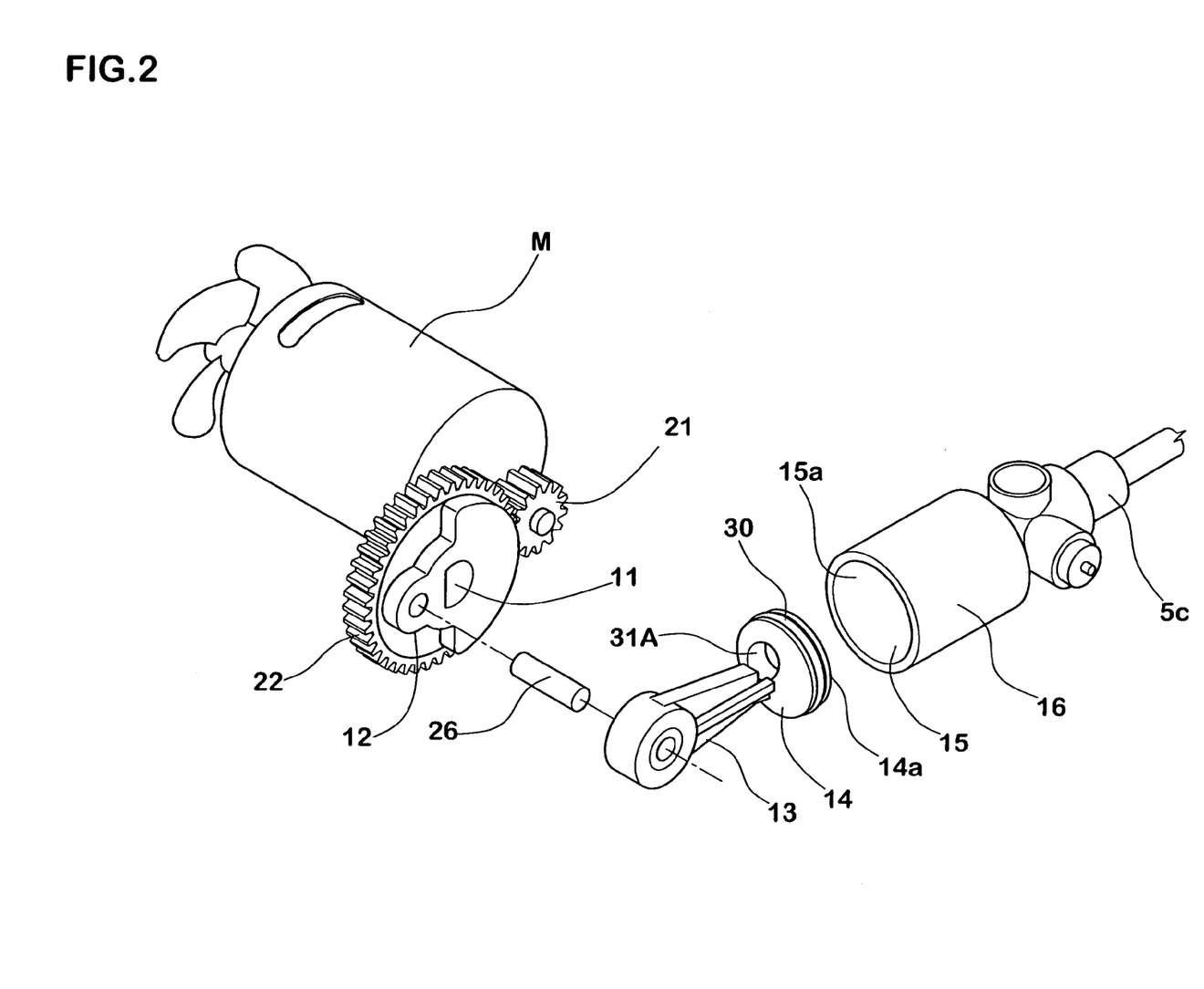
FIG. 2 is an exploded perspective view showing a main portion of the apparatus.

As shown in FIGS. 1 and 2, the compact simplified compressor apparatus 1 is provided with a rotating shaft 11 rotationally driven by a motor M, a compact compressor 10 activated by the rotating shaft 11, an air feeding means 18 for feeding a high-pressure air from the compact compressor 10 to the tire, and a power source plug 19 for supplying an electricity to the motor M.

The motor M, the rotating shaft 11, the compact compressor 10 and the air feeding means 18 are received within a case 20 consititutated by housings 20A and 20B which can be separated into upper and lower parts. A hose 4A provided with a joint 5a connectable to seal pump-up apparatus 3 (shown in FIGS. 3 and 4) in a leading end is connected to the air feeding means 18. An electric cord 6A provided with the power source plug 19 in a leading end is connected to the motor M. An on-off switch 60 provided in an upper surface of the upper housing 20A is interposed in the electric cord 6A. A DC motor activated by a 12V direct-current power source of an automobile is used as the motor M.

Further, the compact compressor 10 and the air feeding means 18 are assembled in a frame 23 so as to construct an integral air discharging unit 24. The frame 23 is provided with a support wall 23B rotatably supporting an inner end portion of the rotating shaft 11. A gear 22 engaging with a pinion 21 of an output shaft in the motor M and a crank 12 with balance are fixed to an outer end portion of the rotating shaft 11 so as to be integrally rotatable. In this case, the motor M is also fixed by bolt to the support wall 23B. Further, the rotation of the motor M is reduced to about one third to one eighth by a speed reduction mechanism constituted by the pinion 21 and the gear 22 so as to be transmitted to the rotating shaft 11. In this case, the support wall 23B of the frame 23 is provided with a covering portion 23A surrounding an operating portion such as the speed reduction mechanism, the crank 12, a rod 13 and the like, for protection.

Further, the compact compressor 10 is provided with the crank 12 fixed to the rotating shaft 11, the rod 13 rotatably coupled to the crank 12 via a crank pin 26, a piston 14 provided in the leading end of the rod 13, and a cylinder 16 receiving the piston 14 so as to freely reciprocate forward and backward.

Figures 5A, 5B:
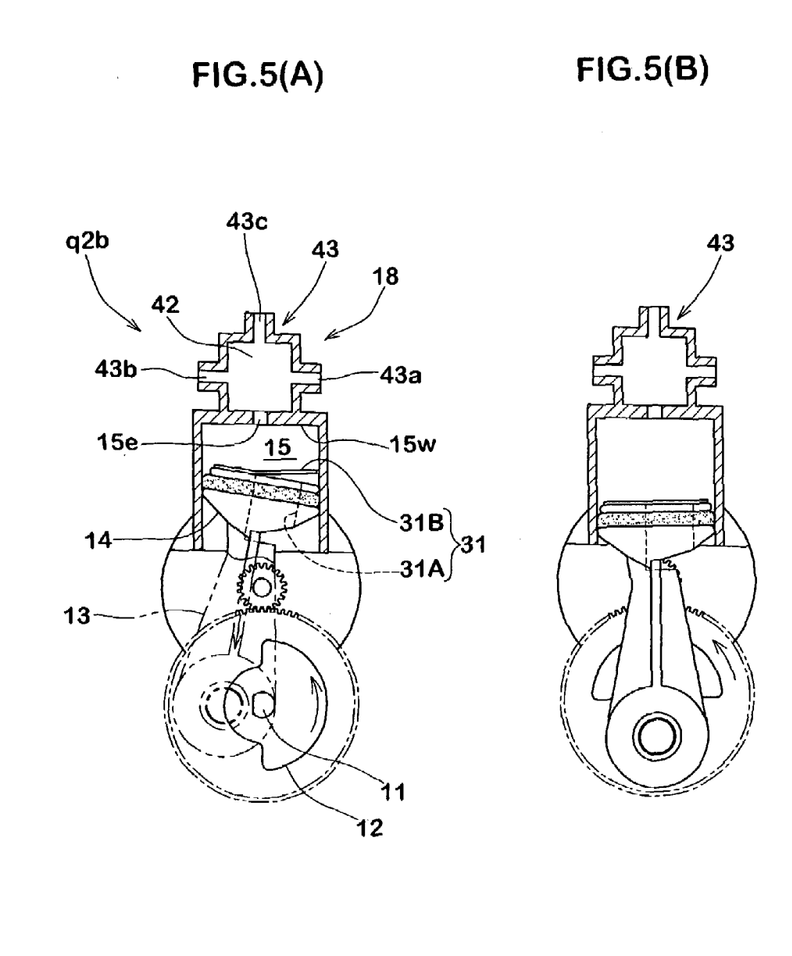
FIGS. 5(A) to 5(C) are cross sectional views showing an operating state of a compact compressor.

The rod 13 and the piston 14 are molded as one integral component and formed of fiber reinforced plastics (FRP) so as to be formed firmly and light in weight. A ring seal 30 is attached to an outer peripheral surface 14a of the piston 14. As shown in FIG. 5(A), in the piston 14, there is arranged an intake valve 31 constituted by a ventilation hole 31A passing forward and backward through the piston 14, thereby communicating with a cylinder chamber 15, and a valve body 31B closing the ventilation hole 31A. The valve body 31B is constituted by a thin plate made of an elastic material such as a rubber, a synthetic resin, a metal or the like, or a thin plate energized by a coil spring, in the present embodiment, is attached to a front end of the piston 14, and can close an opening portion of the ventilation hole 31A with a spring property. In this case, the cylinder 16 is fixed to the frame 23.

Further, the piston 14 can reciprocate forward and backward from a bottom dead center (shown in FIG. 5B) at which the piston 14 is farthest apart from a bottom wall 15w of the cylinder chamber 15 to a top dead center (not shown) at which the piston 14 is closest to the bottom wall 15w, in accordance with the rotation of the crank 12. Further, at a time of moving forward (compression), the intake valve 31 is closed, whereby compressing the air in the cylinder chamber 15 and generating the high-pressure air. At a time of moving backward (sucking the air), the intake valve 31 is opened, thereby sucking the air into the cylinder chamber 15.

Figure 5C:
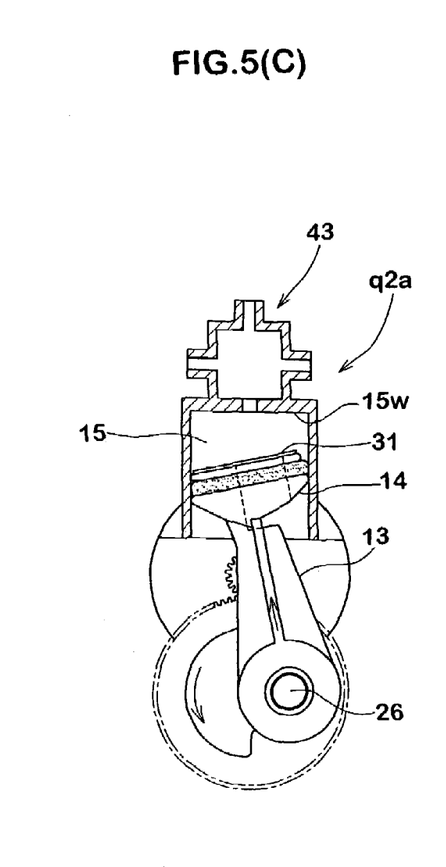

At this time, since the piston 14 and the rod 13 are integrally formed, at an intermediate position at a time of the compression reaching the top dead center from the bottom dead center, as shown in FIG. 5C, the piston 14 becomes in a maximum inclined state q2a inclined to one side to the maximum, with respect to center of an axis of the cylinder chamber 15. Further, at an intermediate position at a time of the intake reaching the bottom dead center from the top dead center, as shown in FIG. 5A, the piston 14 becomes in a maximum inclined state q2b inclined to the other side to the maximum, with respect to center of the axis of the cylinder chamber 15. In the maximum inclined states q2a and q2b, a gap G between an outer peripheral surface 14a of the piston 14 and an inner peripheral surface 15a of the cylinder chamber 15 is increased in comparison with a gap G in the state of the top dead center and the bottom dead center.

Accordingly, in the compact compressor 10 mentioned above, even in the case that the gap G changes, it is desired to securely seal the gap G by the ring seal 30.

Figure 7:
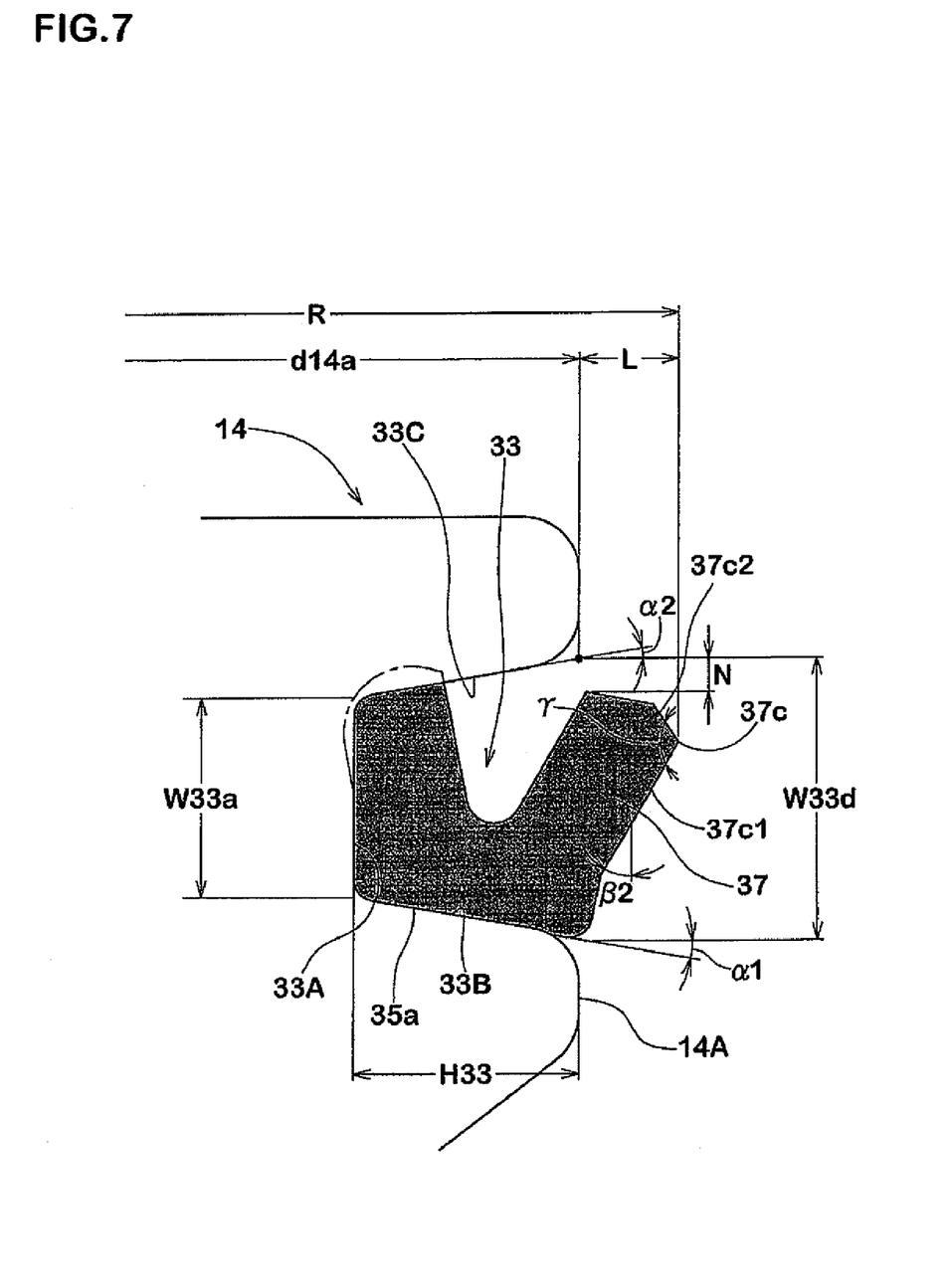
FIG. 7 is a cross sectional view showing a state in which the ring seal is attached to a peripheral groove.

The ring seal 30 is fitted to a peripheral groove 33 provided in the outer peripheral surface 14a of the piston 14. The peripheral groove 33 is provided with a groove bottom surface 33A which is in parallel to a central axis of the piston 14, and groove side surfaces 33B and 33C, each of which extends from an end edge in a rod side and an end edge in an opposite rod side, as shown in FIG. 7. Each of the groove side surfaces 33B and 33C is inclined in a direction in which a groove width is increased toward the outer peripheral surface 14a. Angles α1 and α2 which the groove side surfaces 33B and 33C form with respect to a radial line perpendicular to the groove bottom surface 33A are preferably within a range between 5° and 20°. In this case, the angles α1 and α2 may be made equal to each other, or the angle α1 of the groove side surface 33B in the rod side may be made smaller so as to increase a resisting force of the piston 14 at a time of the compression. In the present embodiment, the angles α1 and α2 are both set to 10°.

A width W33a of the groove bottom surface 33A of the peripheral groove 33 is preferably within a range between 0.9 and 3.6 mm, and further preferably within a range between 1.5 and 2.5 mm. In the present embodiment, it is set to 1.8 mm. A groove depth H33 from the outer peripheral surface 14a is preferably within a range between 1.0 and 4.0 mm, and further preferably within a range between 1.6 and 2.3 mm. In the present embodiment, it is set to 2.0 mm. As mentioned above, since the peripheral groove 33 is formed in a shape in which the groove width is expanded toward the outer peripheral surface 14a, the ring seal 30 can be easily attached. Further, in cooperation with a V shape of the ring seal 30 mentioned below, it is possible to prevent the ring seal 30 from deviating at a time of operating while achieving an excellent seal effect.

Figure 6A:
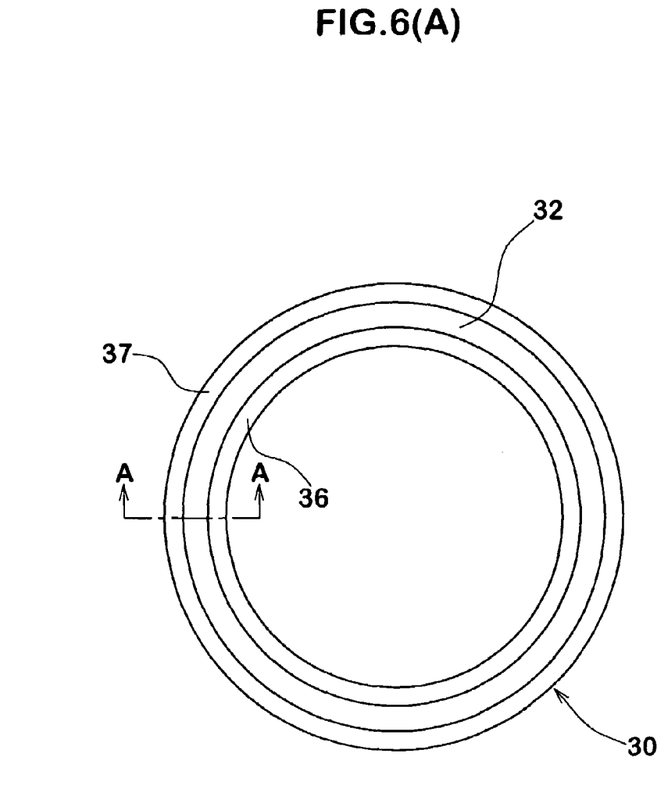
FIG. 6(A) is a plan view of a ring seal.
Figure 6B:
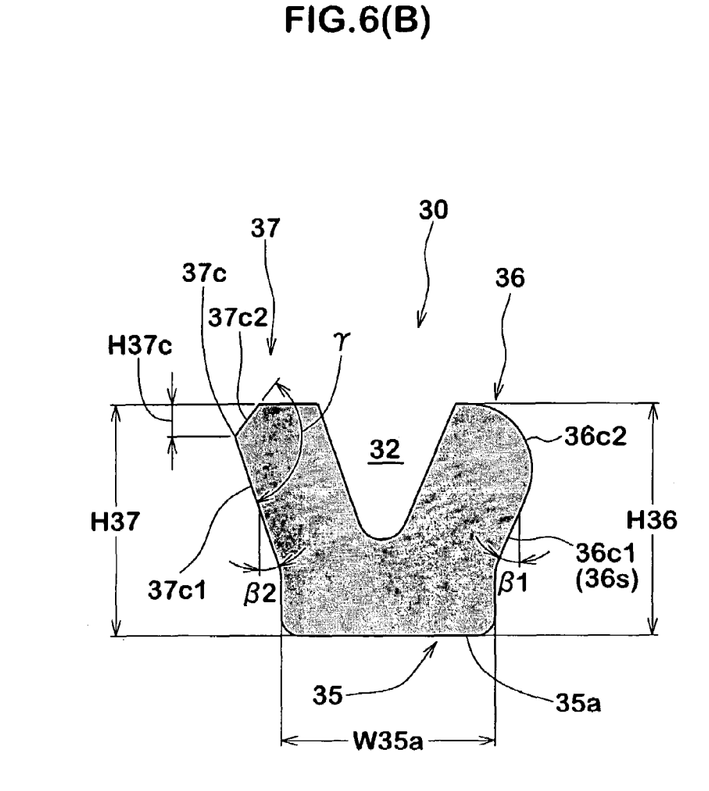
FIG. 6(B) is a cross sectional view along a line A-A in FIG. 6(A)

The ring seal 30 mentioned above is constituted by a circular ring body as shown in FIG. 6(A). Further, as a horizontal cross section including a central axis of the ring seal 30 is shown in FIG. 6(B), the ring seal 30 comprises a base portion 35 formed in an approximately rectangular cross sectional shape and having a flat base surface 35a seating on the rod side groove side surface 33B of the peripheral groove 33, and inner and outer lip portions 36 and 37, each extending from the base portion 35 toward radially inside and outside so as to be opened toward the opposite rod side. Accordingly, the V-shaped groove 32 is formed between the lip portions 36 and 37. In this case, the base surface 35a forms a right angle with respect to the central axis of the ring seal 30, in the present embodiment.

The inner lip portion 36 and the outer lip portion 37 are formed so as to have an approximately equal thickness to each other in a root portion. Further, in a free state of the ring seal 30, an inner peripheral surface 36s (a side surface in an opposite side to the V-shaped groove 32) of the inner lip portion 36 is formed by an inclined surface 36c1 which is inclined at an angle β1 with respect to a line perpendicular to the base surface 35a, and a convex circular arc shaped curved surface 36c2 in a leading end side. Further, an outer peripheral surface (a side surface in an opposite side to the V-shaped groove 32) of the outer lip portion 37 is formed by an inclined surface 37c1 which is inclined at an angle β2 with respect to the line perpendicular to the base surface 35a, and an inclined surface 37c2 in a leading end side which intersects the inclined surface 37c1 at an angle γ between 80 and 140°.In this case, a height H37c of the inclined surface 37c2 between its leading end and an intersecting point 37c of the inclined surfaces 37c1 and 37c2 is set to a range which is 5 to 15 % of an entire height H37 of the outer lip portion 37 including the height of the base portion. Further, the angles β1 and β2 are set to a range between 10° and 40°, and preferably a range between 15 and 30°. In the present embodiment, the angles β1 and β2 are both set to 22°.

Further, a width W35a of the base surface 35a is set to be equal to a length extending along the side surface of the rod side groove side surface 33B of the peripheral groove 33, and the base surface 35a is seated on the groove side surface 33B, as shown in FIG. 7. Further, it is preferable that the inner lip portion 36 is brought into contact with the groove bottom surface 33A of the peripheral groove 33 in a state in which the base surface 35a is seated. Accordingly, the angle β1 is set to a range which is equal to or more than the angle α1 of the peripheral groove 33 and is equal to or less than (α1+15°), thereby preventing the outer lip portion 37 from collapsing onto an inner side in a radial direction. Further, it is preferable that the inner lip portion 36 is pressed between the groove bottom surface 33A and the groove side surface 33C in the opposite rod side so as to be held therebetween, in a state in which the inner lip portion 36 is attached to the peripheral groove 33. Accordingly, an entire height H36 of the inner lip portion 36 including the base portion is set larger in a range between 2 and 10 % than the width of the portion of the peripheral groove 33.

Further, the groove side surface 33C in the opposite rod side of the peripheral groove 33 is inclined to the opposite rod side at the angle α2 mentioned above, and the outer lip portion 37 is also inclined to an outer side in the radial direction at the angle α2 with respect to the base surface 35a. As a result, even in the case that the height H37 is made equal to the height H36 of the inner lip portion 36 including the base portion, the leading end of the outer lip portion 37 can be apart from the groove side surface 33C in the opposite rod side at a distance N (shown in FIG. 7). Accordingly, even in the case that the outer lip portion 37 is bent inward in the radial direction, it is possible to prevent a collision with the groove side surface 33C in the opposite rod side. Further, in accordance with this structure, the intersecting point 37c of the outer lip portion 37 protrudes to an outer side in the radial direction at the distance L from the outer peripheral surface 14a of the piston 14. In other words, in a non-insertion state in which the piston 14 is not inserted to the cylinder chamber 15, an outer diameter R of the outer lip portion 37 is obtained by adding a diameter d14a of the outer peripheral surface 14a of the piston 14 to a double of the distance L, in accordance with the following expression.

$$R = d14a + 2 \cdot L$$

In this case, the angle γ between the inclined surfaces 37c1 and 37c2 of the outer lip portion 37 is preferably set to a range between 90 and 130° in a free state, and is preferably set such that a bisector of the angle γ is perpendicular to the inner peripheral surface 15a of the cylinder chamber 15, in the inserted state. Accordingly, the contact with the inner peripheral surface 15a can be equalized at a time of reciprocating, and it is possible to improve a smoothness of a slide motion.

Figure 8A:
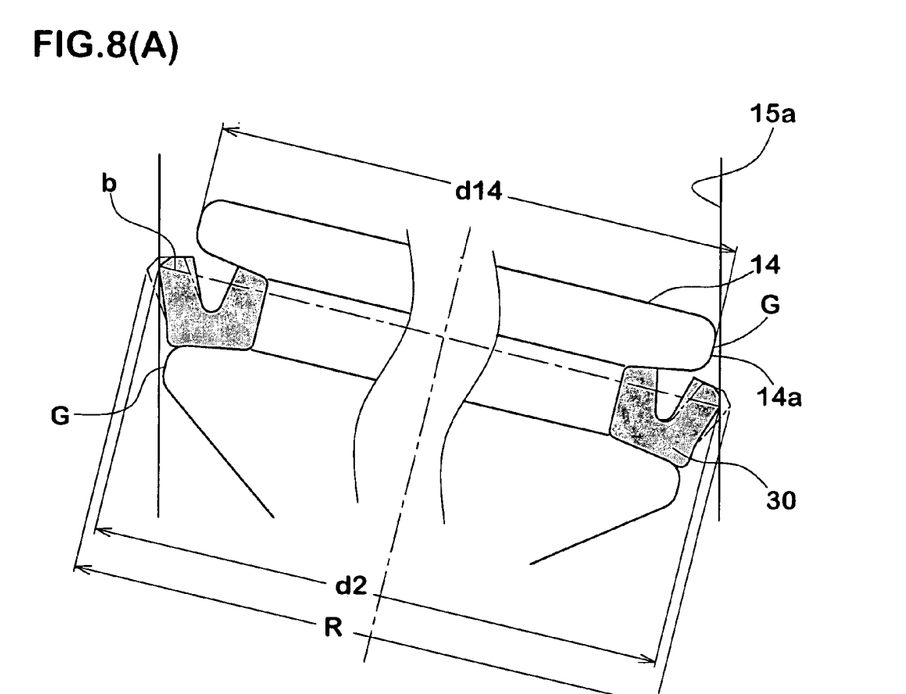
FIG. 8(A) is a diagrammatic view showing an inclined state of a piston.
Figure 8B:
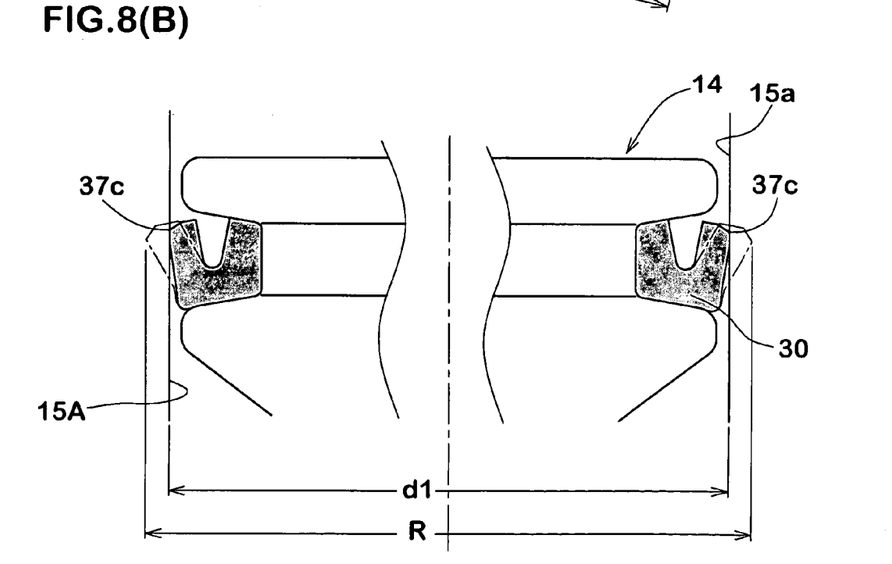

In this case, in connection with the setting of the distance L mentioned above, it is first important that the outer diameter d14a of the outer peripheral surface 14a of the piston 14 can secure the gap G between the outer peripheral surface 14a of the piston 14 and the inner peripheral surface 15a of the cylinder chamber 15 even in the maximum inclined state q2 of the piston 14, whereby the collision is not generated. Accordingly, the outer diameter d14a of the outer peripheral surface 14a is set while taking into consideration a thickness of the piston 14, a chamfer of the peripheral edge portion and the like (FIG. 8A).

On the other hand, in the maximum inclined state q2 mentioned above, an outline b obtained by connecting the intersecting point 37c of the ring seal 30 and a contact point with which the inner peripheral surface 15a of the cylinder chamber 15 is brought into contact forms an oval. Further, it is indispensable to seal in a longer diameter d2 (a shorter diameter corresponds to the inner diameter d1 of the cylinder chamber 15) of the oval. Accordingly, the outer diameter R of the outer lip portion 37 is set to 1.02 to 1.15 times of the longer diameter d2. Therefore, even in the maximum inclined state q2, as shown in FIG. 8(A), a leak of the compressed air is reduced. In this case, if it is more than 1.15 times, the contact pressure is excessively increased, and a working efficiency and an abrasion resistance are lowered. On the contrary, if it is less than 1.02 times, the air leak tends to be generated. Accordingly, the outer diameter R is preferably between 1.03 and 1.08 times of the longer diameter d2.

Further, since the ring seal 30 is provided with the structure mentioned above, the outer lip portion 37 is elastically deformed in the radial direction even in the case that the gap G is changed on the basis of the incline of the piston 14, whereby it is possible to seal the gap G. In particular, at a time of the compression, the compressed air within the cylinder chamber 15 is applied to the outer lip portion 37. In other words, the pressure of the compressed air is applied in a direction of pressing out the outer lip portion 37 to an outer side in the radial direction, thereby improving a contact property with the cylinder chamber 15. Therefore, it is possible to prevent an evagination of the outer lip portion 37 and an air leak from the gap. Further, it is possible to lower a reduction of a seal force due to an aged distortion as well as it is possible to reduce a generation of torsion of the piston 14 so as to reduce the air leak, and it is possible to make the operation smooth. Further, even in the case that the gap G becomes largest in the maximum inclined state q2, it is possible to securely achieve the seal.

The ring seal 30 is formed by using a rubber material such as a hydrogenated nitrile rubber (HNBR), a nitrile rubber (NBR), a butadiene rubber (BR), a styrene-butadiene rubber (SBR), a chloroprene rubber (CR), an ethylene propylene rubber (EPDM) and the like. In particular, since the hydrogenated nitrile rubber (HNBR) and the nitrile rubber (NBR) are excellent in an elasticity and a heat resistance, it is possible to stably achieve a sealing property over a long period of time even in a wide temperature environment between −30° C. and 80° C., and they can be preferably used in the ring seal 30 having an approximately V-shaped cross section and having the inner and outer lip portions 36 and 37.

Further, in the case of the hydrogenated nitrile rubber (HNBR) or the nitrile rubber (NBR), it is preferable that a rubber hardness (durometer A hardness) is set, for example, in a range between 65° and 80°. In the present embodiment, the rubber hardness 74° is employed. A lower limit value of the rubber hardness is preferably equal to or more than 70°, and an upper limit value is preferably equal to or less than 75°. In this case, if it is more than 80°, a frictional resistance of the ring seal 30 becomes too large, and on the contrary, if it is less than 65°, the seal pressure with respect to the inner peripheral surface 15a of the cylinder chamber 15 comes short so as to cause a pressure reduction of the high-pressure air.

Further, in order to reduce the frictional resistance between the inner peripheral surface 15a of the cylinder chamber 15 and the ring seal 30 so as to make the slide motion of the piston 14 smooth, a grease such as a synthetic hydrocarbon oil (PAO), a mineral oil, a fluorine-contained synthetic oil, a diester, a polyol ester, a polyglycol, a phenyl ether, a silicone or the like is used as a lubricant. Among them, the synthetic hydrocarbon oil (PAO) achieves an excellent durability, for example, in a temperature range from a low temperature of −30° C. to a high temperature of 80° C. Accordingly, it can be preferably employed as the grease for the compact simplified compressor apparatus 1 for the puncture emergency repair kit S used in the wide temperature range.

Next, the air discharging unit 24 is integrally structured, as mentioned above, by incorporating the compact compressor 10 and the air feeding means 18 into the frame 23. The air feeding means 18 forms a compressed air inlet 15e provided in the bottom wall 15w of the cylinder chamber 15, and a surrounding wall 43 forming a surge tank 42 communicating with the inlet 15e, as shown in FIG. 5(A). In this case, the surge tank 42 absorbs a pulsation of the high-pressure air from the cylinder chamber 15.

In the surrounding wall 43, as shown in FIGS. 1 and 5 (A), there are formed an attaching port 43a for connecting the hose 4A, an attaching port 43b for connecting the relief valve 17, and an attaching port 43c for connecting the hose 4C communicating with a pressure gauge 44 provided in the upper housing 20A.

Figure 9A:
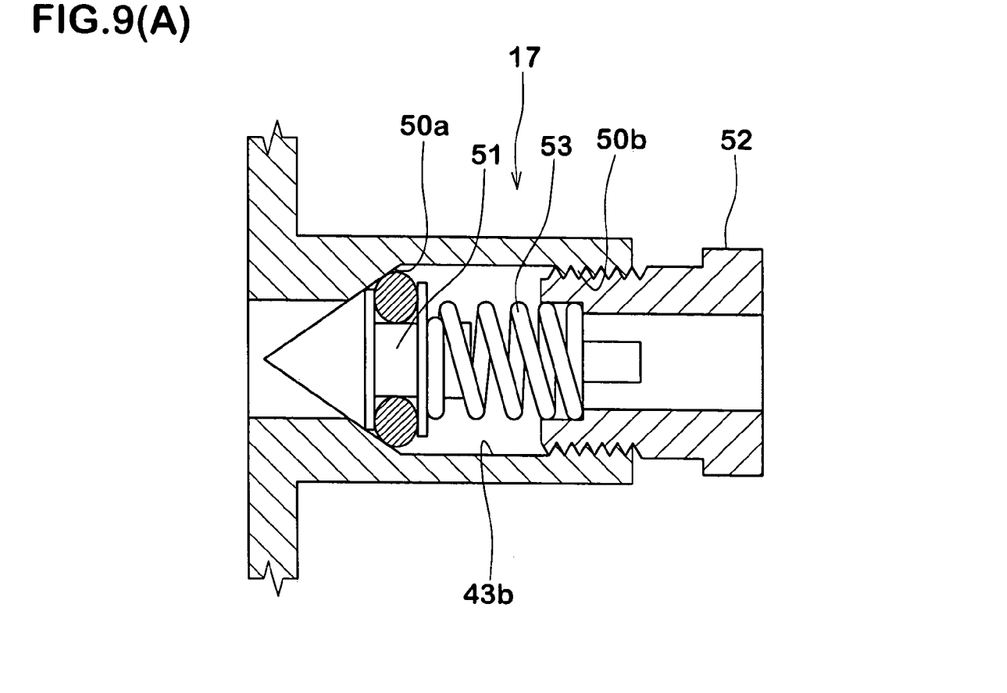
FIG. 9(A) is a cross sectional view showing a closed state of a relief valve.
Figure 9B:
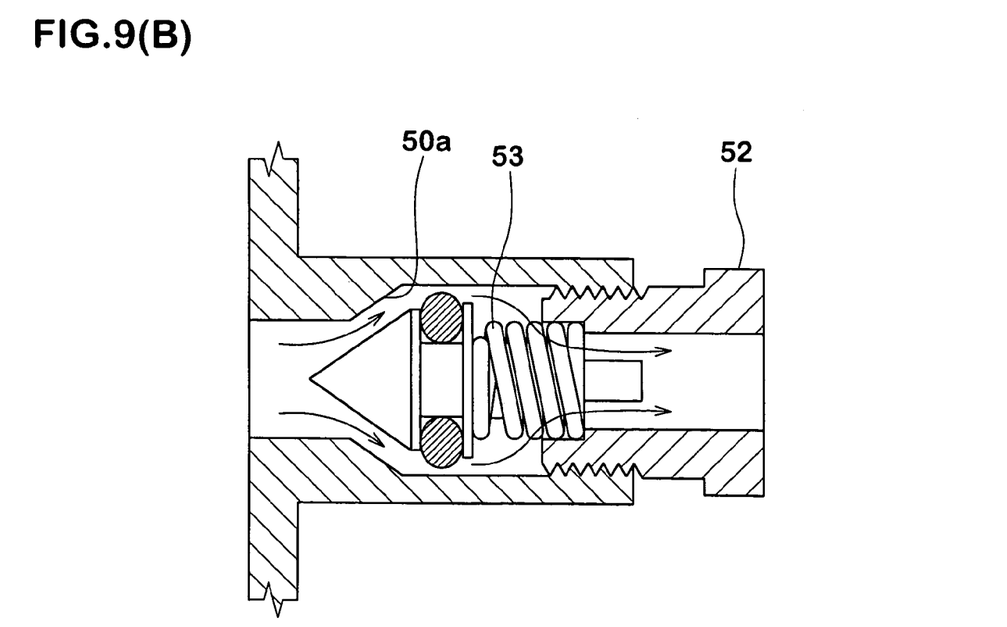
FIG. 9(B) is a cross sectional view showing an open state of the relief valve.

In this case, the relief valve 17 is provided with a conical valve seat 50a formed in an air inflow side of the attaching port 43b, a screw portion 50b formed in an air outflow side, a valve shaft 51 having a seal brought into contact with the valve seat 50a, an adjusting screw 52 screwed with the screw portion 50b, and a pressing spring 53 pressing the valve shaft 51 to the valve seat 50a, as shown in FIG. 9(A). Further, as shown in FIG. 9(B), a seal strength is adjusted by screwing forward and backward the adjusting screw 52, and an internal pressure of the surge tank 42 gets over a predetermined value, whereby the valve is opened and the internal pressure is relieved. In other words, when the pressure gets over a set relief pressure (350 kPa in the present embodiment) of the relief valve 17, the relief valve 17 is opened, whereby it is possible to prevent the members from the compact compressor 10 to the tire T from being damaged due to an overpressure, and it is possible to set a tire filling internal pressure.

The pressing spring 53 is formed by using a stainless steel including SUS304 or the like, a piano wire, a spring steel, a tool steel or the like. In the case of the stainless steel, it is preferable to employ a hardened stainless steel. Accordingly, it is possible to reduce a deterioration of the spring force applied to a repeated load, and it is possible to maintain a relief pressure constant even by using a long time use. In this case, if the relief valve 17 is placed about 10 cm a part from the bottom wall 5w of the cylinder 16, it is possible to prevent the pressing spring 53 from being deteriorated due to the heat applied from the cylinder 16 which is going to be a high temperature.

Figure 10A:
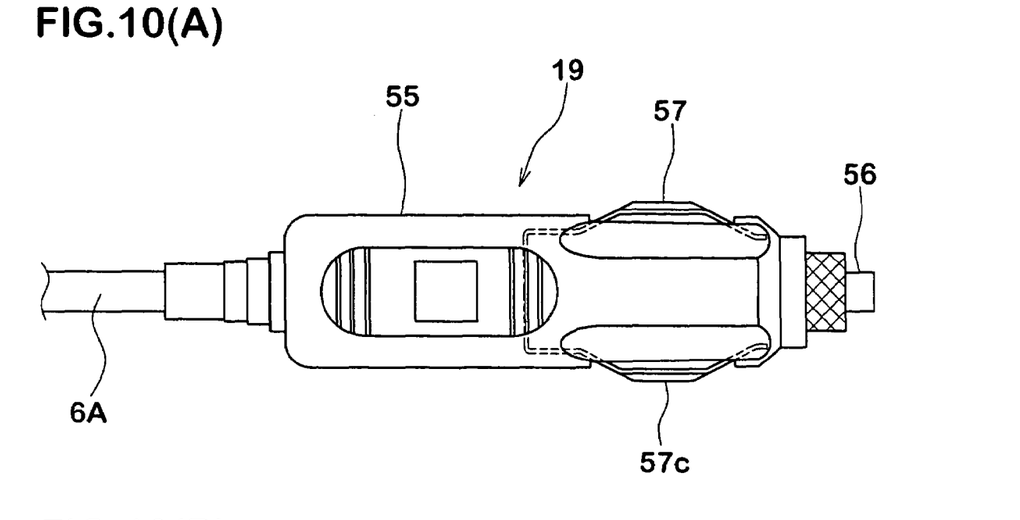
FIG. 10(A) is a plan view showing a power source plug.

Further, the power source plug 19 is connected to a cigar lighter socket communicating with a battery of a motor vehicle, in the present embodiment. The power source plug 19 is provided with a plug main body 55 to which the electric cord 6A is connected, a + side terminal pin 56 conducted with the electric cord 6A and provided in a leading end of the plug main body 55, and a − side terminal connection spring 57 provided in an inner side of the + side terminal pin 56, as shown in FIG. 10 (A). The − side terminal connection spring 57 is provided with a plurality of (four in the present embodiment) leg pieces 57b bending perpendicularly from a coupling piece 57a and extending in parallel to a central axis of the plug main body 55. Each of the leg pieces 57*b* is provided with a terminal portion 57*c* protruding from a surface of the plug main body 55 so as to be exposed, and forms a V-shaped portion 57*c*1 bent in a V-shaped cross sectional shape along a width center line of the leg piece 57*b* in the terminal portion 57*c*, as shown in FIG. 10(C). In this case, a top portion of the V-shaped portion 57*c*1 is curved in a convex circular arc shape in a direction of protruding from the surface of the plug main body 55.

Since the – side terminal connection spring 57 is structured in the manner mentioned above, the V-shaped portion 57*c*1 of the – side terminal connection spring 57 is smoothly pressure contacted with the inner peripheral surface of the cigar lighter socket at a time of inserting the power source plug 19 to the cigar lighter socket. Accordingly, it is possible to make an operation such as an insertion to the cigar lighter socket and a drawing therefrom, a rotation for fixing a torsion of the electric cord 6A and the like smooth, and it is possible to prevent the power source plug from falling out. In this case, the – side terminal connection spring 57 is formed by using a phosphor bronze, a copper, a stainless steel or the like, however, particularly in the – side terminal connection spring 57 using the phosphor bronze metal plated by Ni on the basis of JISC5191, an electric conductivity is high, a high strength and excellent spring property and abrasion resistance can be achieved, a strong chemical corrosion is obtained, and it is possible to optimize a resistance at a time of drawing. Accordingly, this structure is preferable.

The description is in detail given above of the particularly preferable embodiment, however, the present invention is not limited to the illustrated embodiment, but can be achieved on the basis of variously modified aspects.

EXAMPLES

A pump performance is compared between the case (examples 1 and 2) of using the V-shaped ring seal shown in FIGS. 4 to 6 in accordance with the present invention, and the case (a comparative example 1) using a conventional solid O-ring. The ring seal in accordance with the example 1 employs an NBR (a rubber hardness 74°), and the ring seal in accordance with the example 2 employs a silicone rubber. The compressors using the ring seals are operated under two kinds of environments of 25° C. and −30° C., and a time until the internal pressure of 250 kPa is filled in the tire having a tire size of 225/60R16 is measured. As results of measurement are shown in Table 1, it is known that a pressure increasing performance particularly at a low temperature is higher in the examples 1 and 2 in comparison with the comparative example 1, and a filling time is reduced. The pressure increasing performance at the low temperature time is a particularly preferable performance. In this case, the ring seal used in the examples 1 and 2 is structured such that the width W33*a* of the groove bottom surface 33A of the peripheral groove 33 is 1.8 mm, the width W33*d* of the opening portion is 2.5 mm, a ratio R/d2 is 1.05 and the maximum angle of incline of the piston is 20°.

TABLE 1

| | | Ring seal | | |
|---|---|---|---|---|
| | | Example 1 | Example 2 | Comparative Example 1 |
| Ring seal shape | | V shape | V shape | O type |
| Ring seal material | | NBR | Silicone rubber | NBR |
| Pressure increasing performance | 25° C. | 5' 56" | 6' 05" | 5' 57" |
| | −30° C. | 6' 43" | 8' 21" | 8' 42" |

REFERENCE EXAMPLES

A durability test is executed by using compressors in accordance with reference examples 1 to 3 respectively employing the synthetic hydrocarbon oil, the mineral oil and the fluorine synthetic oil as the grease, on the basis of the specification in Table 2, and repeating an operation (five minutes) and a stop (twenty five minutes) at 250 kPa until the total test time becomes 100 hours, under two kinds of environments of 80° C. and −30° C. As a result, no damage is recognized in the reference example 1 under any environments of high temperature and low temperature.

TABLE 2

| | | Grease | | |
|---|---|---|---|---|
| | | Reference Example 1 | Reference Example 2 | Reference Example 3 |
| Grease | | Synthetic hydrocarbon oil | Mineral oil | Fluorine synthetic oil |
| Structure expression | | $\begin{array}{c} R \\ | \\ {-}(CHCH_2)_{n}{-} \end{array}$ | Mixed hydrocarbon $C_xH_{2x-1}$ $|$ ${-}(CHCH_2)_{n}{-}$ | $\begin{array}{c} CF_3 \\ | \\ {-}(CFCF_2{-}O)_{n}{-} \end{array}$ |
| Oil kind | | Middle viscosity PAO | P type middle viscosity | Middle viscosity PFAE |
| Durability performance | 80° C. | No breakage | Breakage of ring seal | Breakage of ring seal |
| | −30° C. | No breakage | No breakage | Breakage of ring seal |

Figure 10B:
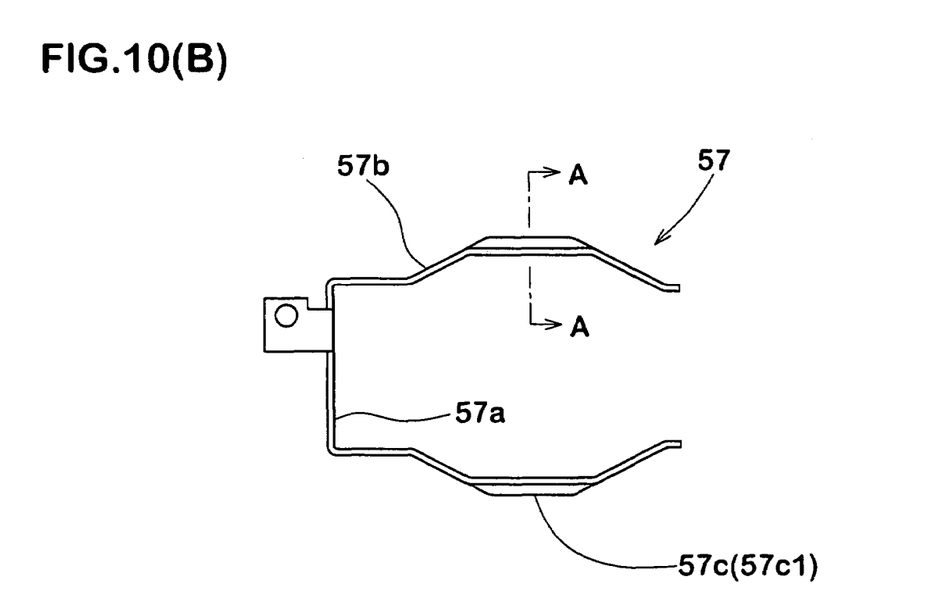
Figure 10C:
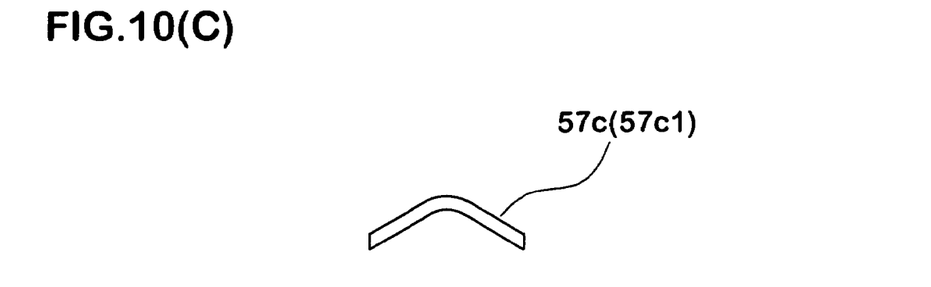
FIG. 10(C) is a cross sectional view along a line A-A thereof.

There are manufactured by way of trial a power source plug using a − side terminal connection spring 57 in FIG. 10 forming a V-shaped portion 57c1 in a terminal end portion 57c and made of a phosphor bronze, a power source plug using a − side terminal connection plug 57 having the same shape and made of a steel in place of the above, and a power source plug in which the terminal portion 57c is changed to a flat shape, as reference examples 4 to 6. Further, a force and a torque at a time of inserting, drawing and rotating them to the cigar lighter socket of the vehicle are measured. The reference example 5 is hard to be attached and detached, and the reference example 6 is hard to be rotated. In comparison with these reference examples, an operability of the reference example 4 is best.

TABLE 3

| | Power source plug | | |
| --- | --- | --- | --- |
| | Reference Example 4 | Reference Example 5 | Reference Example 6 |
| Shape of terminal portion | V shape | V shape | Flat |
| Material | Phosphor bronze | Steel | Phosphor bronze |
| Inserting force | 43 N | 63 N | 38 N |
| Separating force | 28 N | 37 N | 21 N |
| Rotational torque | 0.8 Nm | 0.8 Nm | 1.6 Nm |

What is claimed is:

1. A compact simplified compressor apparatus comprising:
a rotating shaft rotationally driven by a motor;
a compact compressor provided with a rod attached to the rotating shaft via a crank, a piston having a peripheral groove in an outer peripheral surface thereof and arranged in an end of said rod, a cylinder having a cylinder chamber receiving the piston so as to freely reciprocate, and a ring seal sealing between said piston and an inner peripheral surface of the cylinder chamber;
an air feeding means for feeding a high-pressure air from the compact compressor to a tire; and
a power source plug supplying an electricity to said motor, said rod and the piston are formed by an integrally formed body made of fiber reinforced plastics (FRP),
said peripheral groove of said piston has a groove wall surface in a rod side and a groove wall surface in an opposite rod side, each extending from each side of a groove bottom surface,
said ring seal is provided with a base portion having a base surface seating on said rod side groove wall surface, and inner and outer lip portions, which extend from said base portion radially inwardly and outwardly, respectively, so as to be opened toward the opposite rod side,
in a free state in which said ring seal is not attached to said peripheral groove,
an inner peripheral surface of said inner lip portion comprises an inclined surface which is inclined at an angle β1 between 10 and 40° with respect to a line perpendicular to said base surface, and a curved surface with a shape of a convex circular arc, which is connected to a leading end side thereof, and
an outer peripheral surface of said outer lip portion is constituted by an inclined surface which is inclined at an angle β2 between 10 and 40° with respect to the line perpendicular to said base surface, and an inclined surface in a leading end side which intersects the inclined surface at an angle γ in a range of 80 to 140°,
said groove wall surface in said non-rod side of said peripheral groove and said groove wall surface in said rod side are inclined so as to increase a groove width toward an outer side in a radial direction, and angles α1 and α2 of the inclination with respect to a radial line perpendicular to said groove bottom surface are respectively set in a range of 5° to 20°,
said groove bottom surface is in parallel to a central axis of the piston, and
said base surface of the ring seal is at a right angle with respect to the central axis of the ring seal in said free state.

2. A compact simplified compressor apparatus as claimed in claim 1, wherein
said power source plug is a plug connected to a power source communicating with a battery of a motor vehicle, and
the compact simplified compressor apparatus is for a tire puncture emergency repair kit in which a seal pump-up apparatus having a sealing can filled with a puncture seal agent is interposed between said air feeding means and a tire.

3. A compact simplified compressor apparatus as claimed in claim 1 or 2, wherein
said ring seal is formed of a hydrogenated nitrile rubber (HNBR) or a nitrile rubber (NBR), and
a rubber hardness (durometer A hardness) thereof is set to a range between 65° and 80°.

4. A compact simplified compressor apparatus as claimed in claim 1, wherein in an inserted state in which said piston is inserted to the cylinder chamber so as to incline said piston to the maximum,
an outline defined by the portions where an outer lip portion of said ring seal and an inner peripheral surface of said cylinder chamber is oval, and
in a non-inserted state in which said piston is not inserted to the cylinder chamber, an outer diameter R of said outer lip portion is set to a range between 1.02 to 1.15 times of a longer diameter d2 of said oval.

5. A compact simplified compressor apparatus as claimed in claim 1, wherein said angle β1 of said ring seal is set not less than said angle α1 of said peripheral groove, and a difference between said angle β1 and said angle α1 is set not more than 15°.

6. A compact compressor comprising
a rod attached to a rotating shaft via a crank,
a piston having a peripheral groove in an outer peripheral surface thereof and arranged in an end of said rod,
a cylinder having a cylinder chamber receiving the piston so as to freely reciprocate, and
a ring seal sealing between said piston and an inner peripheral surface of the cylinder chamber,
said rod and the piston are formed by an integrally formed body made of fiber reinforced plastics (FRP),
said peripheral groove of said piston has a groove wall surface in a rod side and a groove wall surface in an opposite rod side, each extending from each side of a groove bottom surface,
said ring seal is provided with a base portion having a base surface seating on said rod side groove wall surface, and inner and outer lip portions, which extend from said base portion radially inwardly and outwardly, respectively, so as to be opened toward the opposite rod side,
in a free state in which said ring seal is not attached to said peripheral groove,
an inner peripheral surface of said inner lip portion comprises an inclined surface which is inclined at an angle β1 between 10 and 40° with respect to a line perpendicular to said base surface, and a curved surface with a shape of a convex circular arc, which is connected to a leading end side thereof, and an outer peripheral surface of said outer lip portion is constituted by an inclined surface which is inclined at an angle β2 between 10 and 40° with respect to the line perpendicular to said base surface, and an inclined surface in a leading end side which intersects the inclined surface at an angle γ in a range of 80 to 140°, said groove wall surface in said non-rod side of said peripheral groove and said groove wall surface in said rod side are inclined so as to increase a groove width toward an outer side in a radial direction, and angles α1 and α2 of inclined with respect to a radial line perpendicular to said groove bottom surface are respectively set in a range of 5° to 20°, said groove bottom surface is in parallel to a central axis of the piston, and said base surface of the ring seal is at a right angle with respect to the central axis of the ring seal in said free state.

7. A compact simplified compressor apparatus comprising:
(a) a rotating shaft rotationally driven by a motor;
(b) a compact compressor provided with a rod attached to the rotating shaft via a crank, a piston having a peripheral groove in an outer peripheral surface thereof and arranged in an end of said rod, a cylinder having a cylinder chamber receiving the piston so as to freely reciprocate, and a ring seal sealing between said piston and an inner peripheral surface of the cylinder chamber;
(c) an air feeding means for feeding a high-pressure air from the compact compressor to a tire; and
(d) a power source plug supplying an electricity to said motor, wherein:
(A) said rod and the piston are formed by an integrally formed body made of fiber reinforced plastics (FRP),
(B) said peripheral groove of said piston has a groove bottom surface, a groove wall surface on the rod side and a groove wall surface on the opposite rod side, each wall surface extending from each side of said groove bottom surface, in which said groove wall surface on the rod side and said groove wall surface on the opposite rod side are inclined so as to increase a groove width toward an outer side in a radial direction, and angles α1 and α2 of the inclination with respect to a radial line perpendicular to said groove bottom surface are respectively set in a range of 5° to 20°, and said groove bottom surface is in parallel to the central axis of said piston,
(C) said ring seal is provided with a base portion having a base surface seating on said rod side groove wall surface, and inner and outer lip portions which extend from said base portion radially inwardly and outwardly, respectively, so as to be opened toward the opposite rod side, in which:
in a free state that said ring seal is not attached to said peripheral groove,
an inner peripheral surface of said inner lip portion comprises an inclined surface which is inclined at an angle β1 between 10 and 40° with respect to a line perpendicular to said base surface, and a curved surface with a shape of a convex circular arc, which is connected to a leading end side thereof,
an outer peripheral surface of said outer lip portion is constituted by a first inclined surface which is inclined at an angle β2 between 10 and 40° with respect to the line perpendicular to said base surface, and a second inclined surface on a leading end side which intersects the first inclined surface at an angle γ in a range of 80 to 140°,
an inner peripheral surface of said base portion is perpendicular to said base surface and is continuous with said inclined surface of said inner lip portion, and
an outer peripheral surface of said base portion is perpendicular to said base surface and is continuous with said first inclined surface of said outer lip portion, and
in a state that said ring seal is attached to said peripheral groove of said piston, the entire inner peripheral surface of said ring seal is in contact with said groove bottom surface of said peripheral groove, and
(D) said base surface of the ring seal is at a right angle with respect to the central axis of the ring seal in said free state.

8. A compact compressor comprising:
a rod attached to a rotating shaft via a crank,
a piston having a peripheral groove in an outer peripheral surface thereof and arranged in an end of said rod,
a cylinder having a cylinder chamber receiving the piston so as to freely reciprocate, and
a ring seal sealing between said piston and an inner peripheral surface of the cylinder chamber, wherein:
(A) said rod and the piston are formed by an integrally formed body made of fiber reinforced plastics (FRP),
(B) said peripheral groove of said piston has a groove bottom surface, a groove wall surface on the rod side and a groove wall surface on the opposite rod side, each wall surface extending from each side of said groove bottom surface, in which said groove wall surface on the rod side and said groove wall surface on the opposite rod side are inclined so as to increase a groove width toward an outer side in a radial direction, and angles α1 and α2 of the inclination with respect to a radial line perpendicular to said groove bottom surface are respectively set in a range of 5° to 20, and said groove bottom surface is in parallel to the central axis of said piston,
(C) said ring seal is provided with a base portion having a base surface seating on said rod side groove wall surface, and inner and outer lip portions which extend from said base portion radially inwardly and outwardly, respectively, so as to be opened toward the opposite rod side, in which:
in a free state that said ring seal is not attached to said peripheral groove,
an inner peripheral surface of said inner lip portion comprises an inclined surface which is inclined at an angle β1 between 10 and 40° with respect to a line perpendicular to said base surface, and a curved surface with a shape of a convex circular arc, which is connected to a leading end side thereof,
an outer peripheral surface of said outer lip portion is constituted by a first inclined surface which is inclined at an angle β2 between 10 and 40° with respect to the line perpendicular to said base surface, and a second inclined surface on a leading end side which intersects the first inclined surface at an angle γ in a range of 80 to 140°,
an inner peripheral surface of said base portion is perpendicular to said base surface and is continuous with said inclined surface of said inner lip portion, and
an outer peripheral surface of said base portion is perpendicular to said base surface and is continuous with said first inclined surface of said outer lip portion, and
in a state that said ring seal is attached to said peripheral groove of said piston, the entire inner peripheral surface of said ring seal is in contact with said groove bottom surface of said peripheral groove, and
(D) said base surface of the ring seal is at a right angle with respect to the central axis of the ring seal in said free state.

* * * * *